July 17, 1951  G. W. HARDER  2,561,199
BOAT CARRIER FOR AUTOMOBILES
Filed Feb. 2, 1950
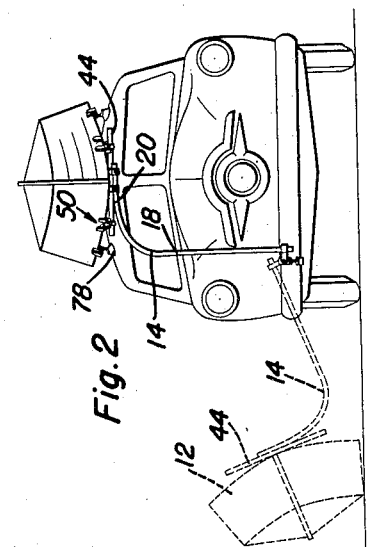
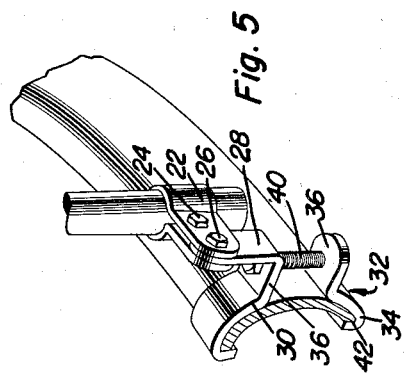
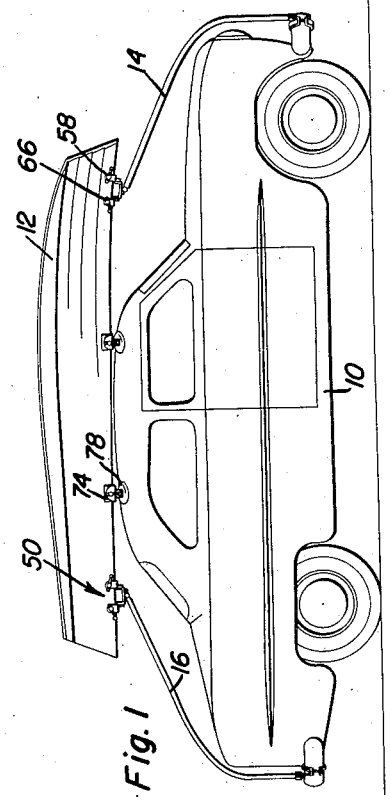
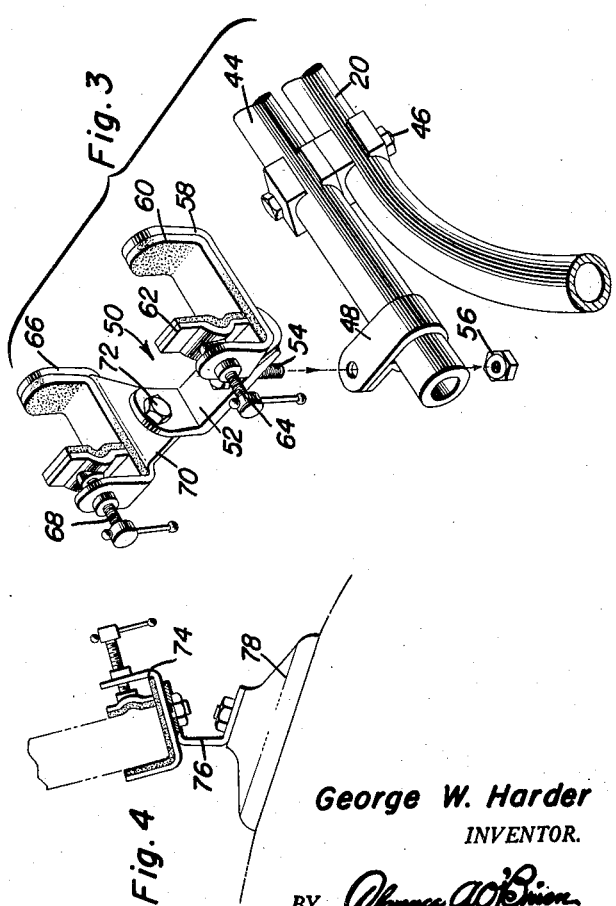
George W. Harder
INVENTOR.

Patented July 17, 1951

2,561,199

UNITED STATES PATENT OFFICE 2,561,199

BOAT CARRIER FOR AUTOMOBILES

George W. Harder, Louisville, Ky.

Application February 2, 1950, Serial No. 141,991

3 Claims. (Cl. 224—42.03)

This invention appertains to an automobile carrier and particularly relates to improvements in the boat loading and carrying device, disclosed in my previous patent, No. 2,448,591, issued September 7, 1948.

The primary object of the instant invention is to simplify the means for mounting the supporting arms on the front and rear bumpers of the vehicle and to the gunwale of the boat.

Another important object of this invention is to permit the supporting arms to be adjustably mounted on the gunwales of the boat and to permit the suction cups or suction supporting members, which are carried by the gunwales and which position the boat on the roof of the car, to be adjustably secured to the gunwales and to be swivelly mounted thereon.

These and ancillary objects and structural features of merit are attained by this invention, the preferred embodiment of which is set forth in the following description and illustrated in the accompanying drawings, wherein:

Figure 1 is a side elevational view of a conventional automobile and boat, illustrating the means, provided by this invention, for mounting the boat on the roof of the automobile and for raising and lowering the boat with respect to the roof;

Figure 2 is a front elevational view, illustrating the boat in a lowered and raised position;

Figure 3 is an exploded perspective view of the means provided for securing the upper portions of the supporting arms to the boat;

Figure 4 is an enlarged view of the means provided for securing the suction cups or positioning members to the gunwales of the boat, the members positioning the boat on the roof of the automobile, and, Figure 5 is a fragmentary perspective view of the means provided for pivotally mounting the lower ends of the supporting arms to the front rear bumpers of the vehicle.

In the accompanying drawings, a conventional motor vehicle 10 is depicted and also, a conventional boat 12 is illustrated, the boat being mountable on the roof of the vehicle, in a manner as provided by this invention. As disclosed in the above patent, a pair of supporting arms may be pivotally secured to the front and rear bumpers of the vehicle and may be angularly formed and adjustably and detachably connected to the gunwales of a boat for swinging the boat from a lowered position to a raised position on the roof of the vehicle, as seen in Figure 2. This invention more particularly appertains to a particular means for securing the supporting arms to the front and rear bumpers of the vehicle and for securing the supporting arms to the gunwales of the boat.

Thus, angular arms 14 and 16 are provided, one of the arms being secured to the front bumper and the other arm to the rear bumper but each of the arms being identically constructed and secured to the bumpers and to the boat.

Thus, the supporting arm 14 is substantially L-shaped and includes a vertical section 18 and an integral horizontal section 20, which is disposed at right angles to the section 18, it being noted that the section 18 extends inwardly and upwardly, as seen in Figure 1.

The lower terminals of the sections 18 of both of the arms 14 and 16 are provided with split clamps 22, which are concentrically disposed thereon and secured thereto by a bolt 24. Pins 26 extend through the clamps and through the upstanding lip or flange 28 of the upper section 30 of a bumper clamp 32. The bumper clamp 32 includes the upper section 30 and a lower section 34, both of the sections being formed with laterally extending perforated flanges 36, the flange or lip 28 extending upwardly from the flange 36 of the section 30. A bolt or fastening assembly 40 extends through the flanges and secures the same together, with the sections 30 and 34 having inturned lips 42 to clampingly engage on the upper and lower edges of the bumpers. It is to be noted that the brackets 32, with particular attention being directed to the sections 30 and 34, conform to the curvature of the bumper and are snugly fitted thereon. In this manner, the supporting arms 14 and 16 are pivotally mounted on the bumpers of the vehicle for vertical swinging movement thereon to a lowered and raised position, as seen in Figure 2.

Means is provided for securing the upper sections 20 of the supporting arms to the gunwales of the boat and includes a supporting rod 44. The supporting rod 44 is secured to the section 20 by means of fasteners 46 and is disposed parallel therewith. The opposing ends of the supporting rods 44 are provided with split clamps 48, the clamps adjustably supporting the clamping means 50 for securing the supporting rod or tube 44 to the boat gunwales. The means 50 includes a supporting plate 52, which is centrally apertured and through which a bolt 54 extends, the bolt passing through the clamp 48 and being adjustably secured thereto by the nut 56. The plate 52 rigidly supports at one end a U-shaped clamp 58, having its inner surfaces provided with a padding 60 and having a movable jaw 62 slidably mounted therein by a screw 64.

A C-clamp 66, which is padded similar to the clamp 58, is provided with a clamping screw 68 for securing it to the gunwales of the boat and is formed with a lateral extension 70. The extension 70 is secured by a fastener 72 to the member 52.

Similar C-clamps 74 are secured to the gunwale of the boat and a U-shaped bracket 76 is carried by the clamps, with one leg of the bracket bolted to the clamps and the opposing leg supporting a suction cup 78, which is bolted thereto. As seen in Figure 4, the bracket can be swung around into a reverse position to compensate for various automobile roof contours and is rotatable about the C-clamp. Also, the clamps 58 and 66 can be adjusted, with respect to the supporting rod 44 by means of the clamps 48 and the clamps can be rotated about the clamps 48. The clamp 66 can effect an independent movement, with respect to the clamp 58, through the fastener arrangement 72.

Thus, the clamps are adjustably carried by the supporting arms and the clamp 74 adjustably supports the suction cup 78, whereby the supporting arms can be utilized with any type of boat or any type of car.

Having described the invention, what is claimed as new is:

1. A boat loading device for use with a vehicle having front and rear bumpers and a roof comprising a pair of angular supporting arms pivotally secured to the bumpers and extending inwardly relative to each other, supporting members secured to the inner ends of the arms and disposed parallel with the bumpers, clamps adjustably carried by the members and detachably affixed to the gunwales of a boat and suction cups adjustably clamped to the boat for positioning the boat on the roof, C-clamps secured to the gunwales of the boat and U-shaped brackets rotatably depending from the clamps and supporting the suction cups.

2. A boat loading device for use with a vehicle having front and rear bumpers and a roof comprising a pair of angular supporting arms pivotally secured to the bumpers and extending inwardly relative to each other, supporting members secured to the inner ends of the arms and disposed parallel with the bumpers, clamps adjustably carried by the members and detachably affixed to the gunwales of a boat and suction cups adjustably clamped to the boat for positioning the boat on the roof, a sectional clamp conforming to the contour of the bumpers secured to each bumper, and including an upper and lower section bolted together onto the upper and lower edges of the bumpers, an upstanding flange on each of the upper sections and split clamps secured to the lower ends of the supporting arms and pivotally affixed to the flanges.

3. A boat loading device for use with a vehicle having front and rear bumpers and a roof comprising a pair of angular supporting arms pivotally secured to the bumpers and extending inwardly relative to each other, supporting members secured to the inner ends of the arms and disposed parallel with the bumpers, clamps adjustably carried by the members and detachably affixed to the gunwales of a boat and suction cups adjustably clamped to the boat for positioning the boat on the roof, said clamps being adjustable vertically and horizontally of the supporting members.

GEORGE W. HARDER.

REFERENCES CITED

The following references are of record in the file of this patent:

UNITED STATES PATENTS

| Number | Name | Date |
| --- | --- | --- |
| 1,681,936 | Hillstrom | Aug. 28, 1928 |
| 2,180,032 | Casley | Nov. 14, 1939 |
| 2,392,008 | Squires | Jan. 1, 1946 |
| 2,448,591 | Harder | Sept. 7, 1948 |
| 2,486,316 | Morse et al. | Oct. 25, 1949 |
| 2,521,815 | Will | Sept. 12, 1950 |